United States Patent
Kozakura et al.

[11] Patent Number: 5,967,926
[45] Date of Patent: Oct. 19, 1999

[54] DOUBLE-SIDED MESHING TYPE SILENT CHAIN

[75] Inventors: Nobuto Kozakura; Nobuhiro Odai; Tsutomu Haginoya, all of Saitama-ken, Japan

[73] Assignee: Tsubakimoto Chain Co., Osaka, Japan

[21] Appl. No.: 09/044,033

[22] Filed: Mar. 19, 1998

[30] Foreign Application Priority Data

Mar. 19, 1997 [JP] Japan ................................. 9-066424

[51] Int. Cl.⁶ .............................. F16G 13/04; F16G 13/02
[52] U.S. Cl. ........................... 474/213; 474/206; 474/226
[58] Field of Search ................................. 474/202, 206, 474/210, 212, 213, 226, 228

[56] References Cited

FOREIGN PATENT DOCUMENTS 0 178 818  4/1986  European Pat. Off. .
0 487 146  5/1992  European Pat. Off. .

Primary Examiner—John A. Jeffrey
Assistant Examiner—Matthew A. Kaness
Attorney, Agent, or Firm—Armstrong, Westerman, Hattori, McLeland & Naughton

[57] ABSTRACT

A double-sided meshing type silent chain which permits improvement in service life of the shoe of a chain guide for example, also permits a smooth and high-speed transmission of power, and which has a high durability. A plurality of articular train plates and a plurality of guide train plates are alternately connected together with pins, the plates being formed on the front side with main teeth for engagement with a sprocket located on an inner peripheral side of the chain, and guide plates, whose inner faces are abutted against and guided by side faces of the teeth of the sprocket, are disposed on both outer sides of the plural guide train plates. The rear faces of the plates which constitute at least a part of the trains of plates arranged in the longitudinal direction of the chain are formed with sub-teeth for engagement with a sprocket disposed on an outer peripheral side of the chain, while the rear faces of the remaining train of plates and the rear faces of the guide plates are formed as flat faces which lie substantially in the same plane as the plates adjacent to each other longitudinally of the chain in a stretched state of the chain.

7 Claims, 6 Drawing Sheets

DOUBLE-SIDED MESHING TYPE SILENT CHAIN

BACKGROUND OF THE INVENTION

1. Field of the Invention

The present invention relates to a double-sided meshing type silent chain capable of being engaged with sprockets on both inner and outer peripheral sides of the chain.

2. Description of the Related Art

As a conventional double-sided meshing type silent chain capable of meshing with sprockets on both the inner peripheral side (hereinafter "front side") and the outer peripheral side (hereinafter "rear side") of the chain through a large number of plates connected together in an endless manner, there is known, for example, such a silent chain as shown in FIG. 8. This silent chain 13 is assembled by connecting plates 11 and 12 in an endless fashion. It has teeth for engagement with a sprocket 14 located on an inner or outer peripheral side of the chain 13 and also has teeth for engagement with a sprocket 15 located on the opposite side. The plates 11 and 12 are centrally constricted and a pair of chevron-shaped teeth are formed on both sides of each plate.

FIG. 9 shows another example of a conventional both-side meshing type silent chain. This silent chain 24 is assembled in an endless manner. More particularly, plates 21 each having a pair of chevron-shaped teeth on the front side and being flat on the rear side and plates 22 each being flat on the front side and having a pair of chevron-shaped teeth on the rear side are alternately connected together with pins 23 to constitute the chain 24. There are disposed a sprocket 25 meshing with one of inner and outer periphery sides of the silent chain 24 and a sprocket 26 meshing with the other side. The sprockets 25 and 26 are each formed with teeth at two-pitch intervals, with which the teeth of the plates 21 and 22 come into engagement.

If any of the above conventional silent chains capable of meshing with sprockets on both inner and outer peripheral sides of the chain is used as a timing chain for an automobile engine for example, it becomes possible to bring a sprocket into engagement with the outer periphery on a tension side of a chain circulation path and thereby draw the tension-side path as close as possible to a return-side path of the chain, whereby the space occupied by the entire chain circulation path can be diminished. However, since chevron-shaped teeth for engagement with sprocket teeth are formed on the rear side of the plate, it is difficult to bring the shoe faces of a tensioner and a chain guide into sliding contact with the rear face of the plate.

More particularly, if chevron-shaped teeth are formed on the rear side of the plate, the tops of the plate teeth come into contact with the shoe faces intermittently, so that the shoe faces are substantially worn out, leading to a shortening of their service life, or the vibration-preventing effect is decreased by the intermittent contact, thus causing wear elongation of the chain and leading to generation of noise.

In such a double-sided meshing type silent chain as shown in FIG. 9, which shows the chain coming into mesh with sprocket teeth at two-pitch intervals, the amplitude of a polygonal motion upon such engagement of the two is great and it becomes impossible to perform a smooth high-speed transmission of power. The problem of early-stage sprocket wear also results.

SUMMARY OF THE INVENTION

It is therefore an object of the present invention to solve the above-mentioned problems of the prior art and to provide a double-sided meshing type silent chain which permits improvement in service life of the shoes of a tensioner and a chain guide, also permits a high-speed and smooth transmission of power, and which possesses a high durability.

According to the present invention, in order to achieve the above-mentioned object, there is provided a double-sided meshing type silent chain characterized in that a plurality of articular train plates and a plurality of guide train plates alternately connected together with pins, the articular train plates and the guide plates each being formed on a front side thereof with main teeth for engagement with teeth of a sprocket located on an inner peripheral side of the chain. Guide plates are disposed on both outer sides of the plural guide train plates, inside faces of the guide plates coming into abutment with side faces of the teeth of the sprocket located on the inner peripheral side of the chain and being guided thereby. The rear faces of the plates which constitute at least a part of the plural trains of the articular train plates and the guide train plates are arranged in the longitudinal direction of the chain and are formed with sub-teeth for engagement with teeth of a sprocket located on an outer periphery side of the chain, while the rear faces of the remaining train of plates and the rear surfaces of the guide plates are formed as flat faces which lie substantially in the same plane as the rear faces of the plates adjacent to each other longitudinally of the chain in a stretched state of the chain.

Preferably, the rear faces of only the articular train plates adjacent to the guide plates are formed as flat faces which lie substantially in the same plane as the rear faces of the guide plates in a stretched state of the chain.

In the double-sided meshing type silent chain of the present invention, the main teeth formed on both articular train plates and guide train plates come into engagement with the sprocket located on the inner periphery side of the chain to effect the same transfer of power as in the ordinary type of silent chain. In this case, the inside faces of the guide plates disposed on both outer sides of the guide train plates come into abutment against side faces of the teeth of the inner periphery-side sprocket and are guided thereby, so that a transverse displacement of the chain is prevented.

On the other hand, the sub-teeth formed on the rear faces of plates which constitute at least a part of the trains of the articular train plates and the guide train plates arranged in the longitudinal direction of the chain come into engagement with the sprocket located on the outer peripheral side of the chain, whereby the transfer of power is performed.

The rear faces formed as flat faces of at least the guide plates are brought into sliding contact with the shoe faces of a tensioner and a chain guide to prevent vibration of the chain. Where the chain has not only the guide plates but also another train of plates arranged in the longitudinal direction of the chain and having rear faces formed as flat faces, the rear faces of those plates may also be brought into sliding contact with the shoe faces of the tensioner and the chain guide and be guided thereby.

Particularly, where the rear faces of only the articular train plates adjacent to the guide plates are formed as flat faces which lie substantially in the same plane as the rear faces of the guide plates in a stretched state of the chain, the rear faces of the guide plates and those of the articular train plates adjacent to the guide plates come into sliding contact in a symmetric manner with the shoe faces of a tensioner and a chain guide, so that the chain can be allowed to travel in a smooth and stable condition.

DETAILED DESCRIPTION OF THE PREFERRED EMBODIMENTS

Figure 1:
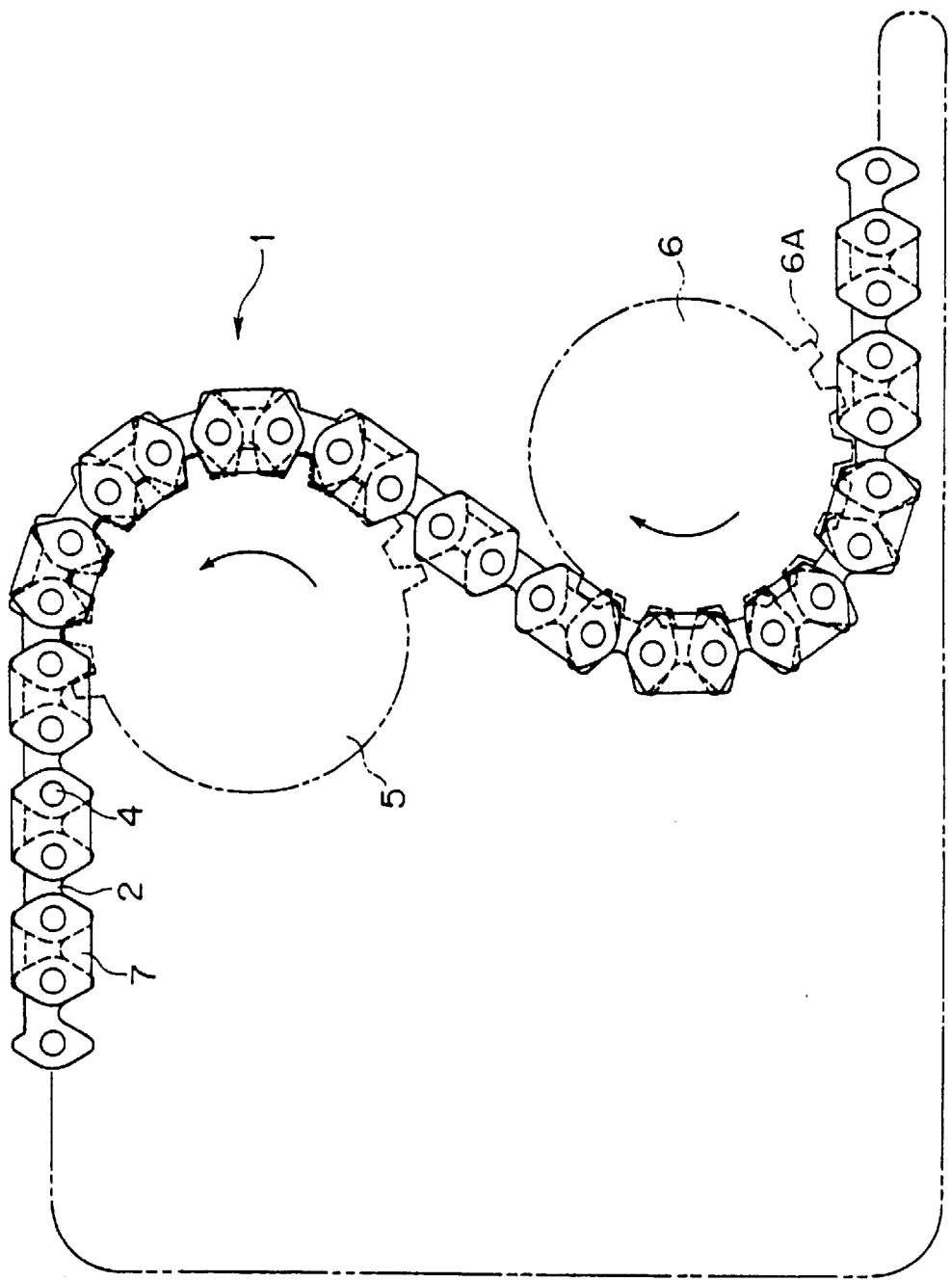
FIG. 1 is a schematic view of a double-sided meshing type silent chain according to a first embodiment of the present invention.
Figure 2:
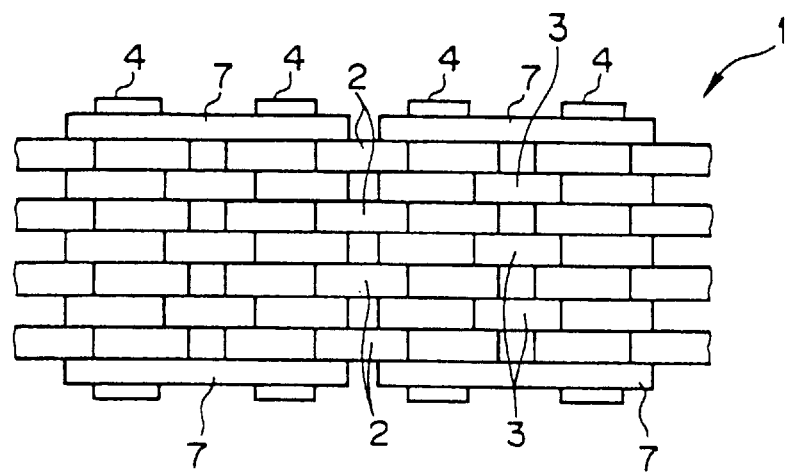
FIG. 2 is a partial view thereof as seen from an outer peripheral side of the chain.

The present invention will now be described in detail with reference to the drawings. FIG. 1 is a schematic view of a double-sided meshing type silent chain (hereinafter referred to simply as "chain") according to first embodiment of the present invention, and FIG. 2 is a partial view of the chain as seen from its outer peripheral side. The chain 1 is assembled by connecting a large number of articular train plates 2 and guide train plates 3 alternately with pins 4 in an endless manner, and it travels circulatively while meshing with a sprocket 5 disposed on an inner peripheral side of the chain 1 and then with a sprocket 6 disposed on an outer peripheral side of the chain.

The articular train plates 2 and the guide train plates 3 are each disposed transversely in a plural number, and guide plates 7 are disposed on both outer sides of such plural guide train plates 3.

Figure 3:
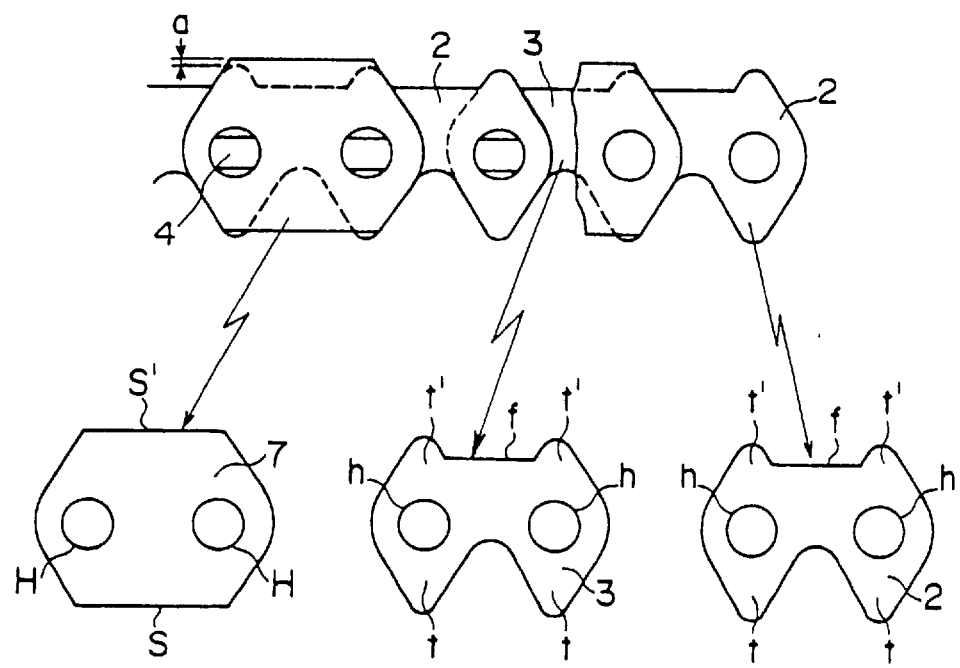
FIG. 3 is a diagram showing shapes of various plates which constitute the silent chain.

FIG. 3 is a diagram showing the shape of each plate as a constituent of the chain 1. As shown in FIG. 3, the articular train plates 2 and the guide train plates 3 have the same shape, with two pin holes for insertion therein of the pins 4 being formed in each plate. On the front side of each of the plates 2 and 3 are formed a pair of main teeth, t, in a bifurcated shape, which main teeth come into engagement with the sprocket 5 located on the inner peripheral side of the chain 1 in FIG. 1. On the rear side of each of the plates 2 and 3 are formed a pair of sub-teeth t' for engagement with sprocket 6 located on the outer peripheral side of the chain.

Between the bottoms of the paired sub-teeth t' is formed a flat face, f, not such a bifurcated shape as the main teeth, t, in order to avoid a decrease in sectional shape at the middle position between the plates 2 and 3 which decrease in sectional shape would cause a reduction in strength.

On the other hand, the guide plates 7 are each formed with two pin holes H to be fitted on pins 4 at each of both ends of the pins. The front and rear sides of the each guide plate 7 are formed as flat faces S and S', respectively.

As shown in FIG. 3, the flat face S' which forms the rear face of each guide plate 7 is projected outward by a slight distance "a" with respect to the sub-teeth t' of each of the articular train plates 2 and guide train plates 3.

The shape of the main teeth, t, is the same as that of an ordinary type of a silent chain, and as the sprocket 5 shown in FIG. 1 there may be used a sprocket of a standard tooth shape. The sprocket 6 meshing with the sub-teeth t' has a shallow tooth bottom and its tooth top 6A is formed as an arcuate surface concentric with the rotational center of the sprocket 6 in order that the flat face, f, can be abutted against and supported by such an arcuate tooth top 6A at the time of engagement of the chain with the sprocket.

Figure 4:
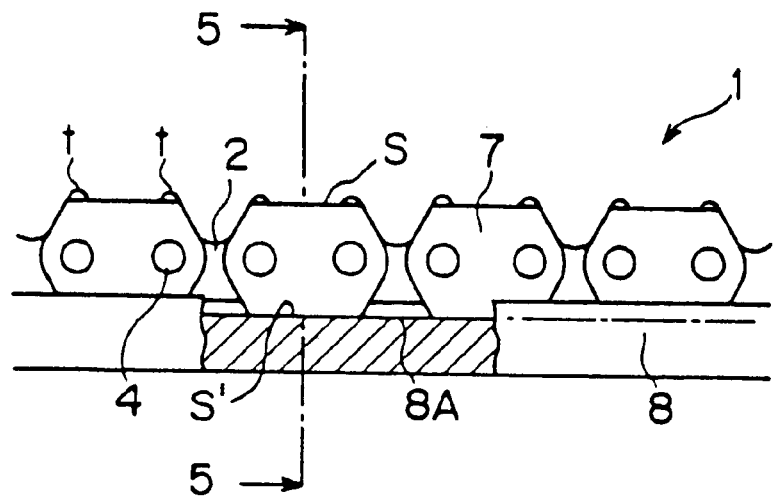
FIG. 4 is a diagram showing a state in which the silent chain is in sliding contact with the shoe face of a chain guide disposed on the outer peripheral side of the chain.

FIG. 4 illustrates a state in which the chain 1 travels in sliding contact with a shoe face 8A of a chain guide 8 disposed on the outer peripheral side of the chain. The flat face S' of each guide plate 7 slides on the shoe face 8A of the chain guide 8 and is thereby guided its traveling.

In this case, since the tips of the sub-teeth t' of the articular train plates 2 and the guide train plates 3 are spaced slightly away from the shoe face 8A by means of the guide plates 7, there is no possibility of abutment of the sub-teeth t' with the shoe face 8A which would accelerate the wear thereof, nor is there any possibility of vibration or noise of the chain 1.

Figure 5:
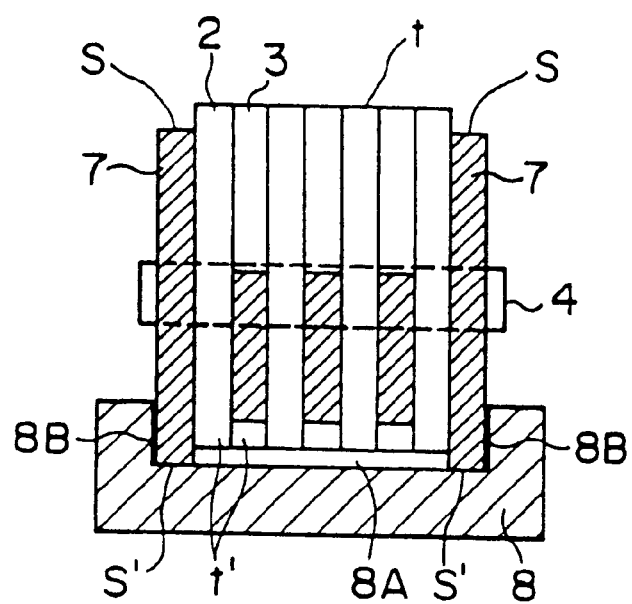
FIG. 5 is a sectional view as seen in the arrowed direction 5—5 in FIG. 4.

If the chain guide 8 is provided on both right and left sides there with such vertical guide faces 8B as shown in FIG. 5, a transverse displacement of both outer side faces of each guide plate 7 is restricted to prevent meandering of the chain 1.

Figure 6:
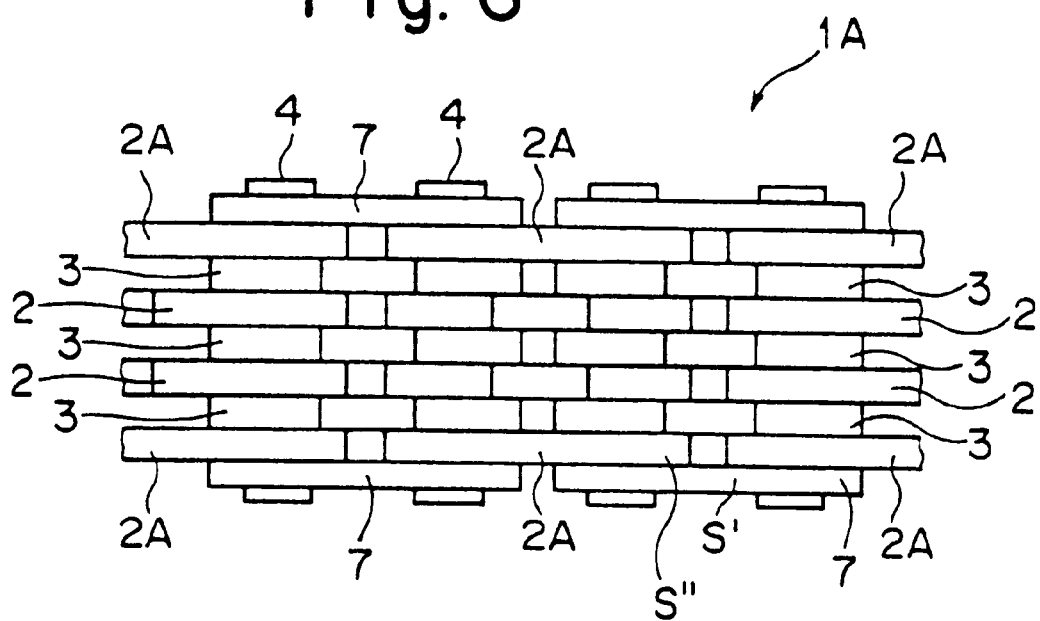
FIG. 6 is a partial view of a both-side meshing type silent chain according to a second embodiment of the present invention as seen from an outer peripheral side of the chain.

FIG. 6 is a partial view of a double-sided meshing type silent chain according to a second embodiment of the present invention, as seen from an outer peripheral side of the chain. In the FIG. 6, as to all of guide train plates, part of articular train plates, pins and guide plates, which constitute the chain indicated at 1A, they are identical with those used in the first embodiment and are therefore represented by the same reference numerals as in FIGS. 1 to 5.

Figure 7:
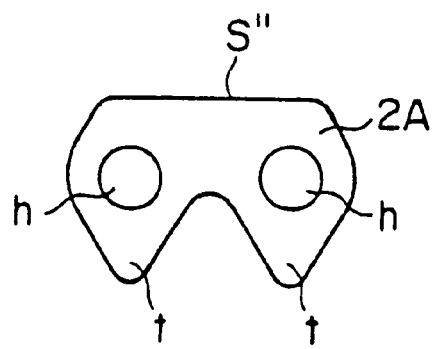
FIG. 7 is a diagram showing the shape of an articular train plate adjacent to a guide plate.
Figure 8:
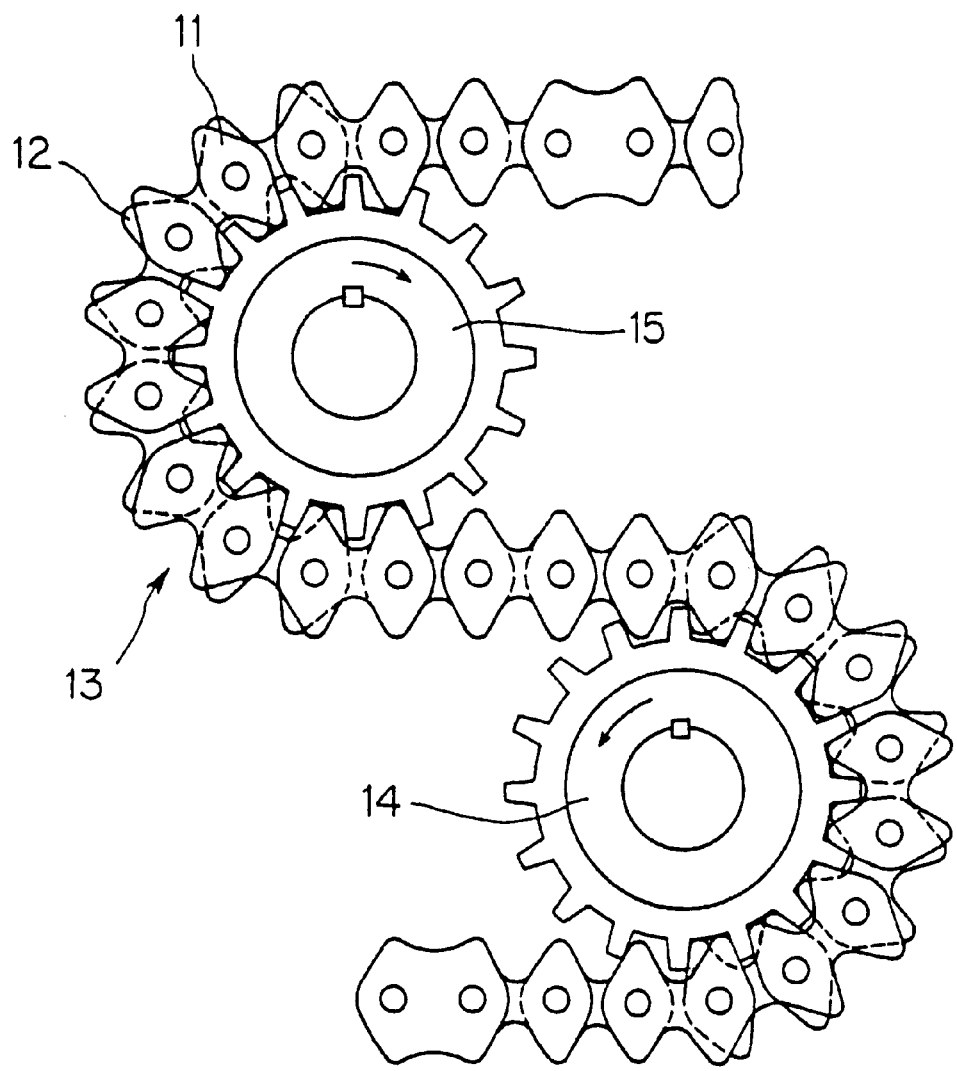
FIG. 8 is a schematic view showing an example of a conventional double-sided meshing type silent chain.
Figure 9:
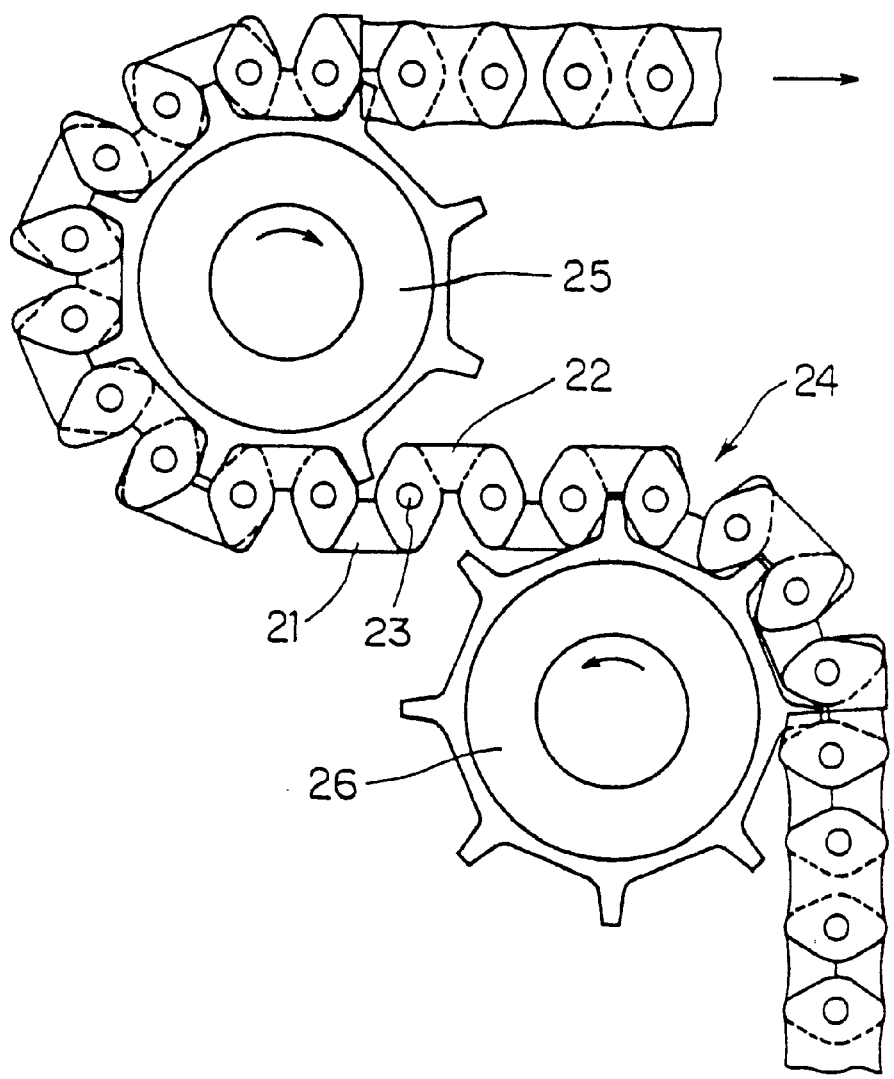
FIG. 9 is a schematic view showing another example of a conventional double-sided meshing type silent chain.

In the chain 1A, a pair of articular train plates 2A arranged adjacent respectively to the inner faces of guide plates 7 disposed on both sides are different in shape from articular train plates 2 located between the paired articular train plates 2A. The rear face of each plate 2A is formed as a flat face S", as shown in FIG. 7. On the front side of each plate 2A, like the articular train plates 2, a pair of main teeth, t, are formed in a bifurcated shape, and two pin holes, h, are also formed.

The flat face S" as the rear face of each articular train plate 2A and the flat face S' as the rear face of each guide plate 7 are formed so as to lie substantially in the same plane in a stretched state of the chain 1A.

Therefore, both flat faces S' and S" which respectively constitute the rear faces of each guide plate 7 and each articular train plate 2A come into sliding contact alternately with the shoe faces of the chain guide and tensioner disposed on the outer peripheral side of the chain 1A. Besides, in the longitudinal direction of the chain 1A, the guide plate 7 and the articular train plate 2A partially overlap each other in the vicinity of pins 4, so that at the incoming position of the chain 1A relative to the shoe face the contact between the shoe face and the chain 1A becomes continuous, whereby the wear of the shoe face and the vibration and noise of the chain 1A can be further diminished in comparison with the chain of the first embodiment.

Although in the second embodiment the rear face of only the articular train plate 2A adjacent to the inside face of each guide plate 7 is formed as the flat face S", the rear face of the guide train plate 3 further adjacent to the inside face of the plate 2A may be formed as a flat face to increase the contact area for the shoe face.

Moreover, a modification may be made if only the rear faces of the plates which constitute at least a part of the trains of articular train plates 2 and guide train plates 3 arranged in the longitudinal direction of the chain are formed with sub-teeth for engagement with the teeth of the sprocket located on the outer periphery side of the chain and insofar as the rear faces of the remaining train of plates and those of the guide plates 7 are formed as flat faces which substantially lie in the same plane as the rear faces of the plates adjacent to each other longitudinally of the chain in a stretched state of the chain.

Further, although in the above embodiments the flat faces S' and S" which constitute the rear faces of the guide plates 7 and the articular train plates 2A, respectively, are projected slightly outwards with respect to the sub-teeth t' of the articular train plates 2 and guide train plates 3, this relation may be reversed, that is, the sub-teeth t' may be projected outwards with respect to the flat faces S' and S". This can be done by adopting a cross-sectional shape having a difference in height so that the shoe faces of the tensioner and chain guide come into sliding contact with only the flat faces S' and S" and not with the sub-teeth t'.

According to the double-sided meshing type silent chain of the present invention, as set forth above, the rear faces of plates which constitute at lease a portion of the trains of articular train plates and guide train plates arranged in the longitudinal direction of the chain, are formed with sub-teeth for engagement with the teeth of the sprocket locate on the outer periphery side of the chain, while the rear faces of the remaining train of plates and those of the guide plates are formed as flat faces which lie substantially in the same plane as the rear faces of the plates adjacent to each other longitudinally of the chain in a stretched state of the chain. Therefore, by bringing the rear faces formed as flat faces of at least the guide plates into sliding contact with the shoe faces of a tensioner and a chain guide, vibration of the chain is prevented.

As a result, the chain slides smoothly in a state of face contact with the said shoe face and, therefore, not only the wear of the shoe face can be diminished but also the vibration of the chain caused by the sliding contact with the shoe face can be diminished. Consequently, the noise of the chain during operation of the chain can be suppressed, and the wear elongation of the chain is reduced, thereby permitting prolongation of the service life of the chain.

Moreover, no matter with which of the sprocket located on the inner peripheral side of the chain and the sprocket located on the outer peripheral side of the chain the chain may come into engagement, the chain engages the sprocket teeth securely pitch by pitch, so that the amplitude of a polygonal motion upon engagement of the chain with the sprocket becomes small, thereby making it possible to perform smooth, efficient transmission of power at high speed.

Further, in the case where the rear faces of only the articular train plates adjacent to the guide plates are formed as flat faces positioned substantially in the same plane as the rear faces of the guide plates, the chain can be allowed to travel more smoothly and stably, whereby the wear of the shoe face and the generation of noise during operation of the chain can be diminished to a greater extent and the durability of the chain can be further enhanced.

Additionally, since the double-sided meshing type silent chain of the present invention can be used as a timing chain for an engine with the shoe faces of a tensioner and a chain guide in abutment against the outer periphery side of the chain, it is possible to bring an idle sprocket into engagement with the outer periphery on a tension side of a chain circulation path and thereby draw the tension-side chain path as close as possible to a return-side chain path. Consequently, not only the space occupied by the entire circulation path can be reduced, but also by engaging a sprocket with the chain from the outer periphery side of the chain it is possible to drive an auxiliary machine such as an oil pump which rotates reverse to the driving shaft.

We claim:

1. A double-sided meshing type silent chain comprising:
   a plurality of articular links, each of said articular links having at least two articular plates, each of said articular plates of said plurality of articular links defining articular plate rows in a longitudinal direction of said silent chain;
   a plurality of guide links, each of said guide links having at least one intermediate plate and two guide plates disposed on both outer sides of said intermediate plate, each of said intermediate plates of said plurality of guide links defining at least one intermediate plates row in the longitudinal direction of said silent chain, each of said guide plates of said plurality of guide links defining guide plates rows in the longitudinal direction of said silent chain, each of said articular links being alternately connected to each of said guide links with pins;
   wherein each of said articular plates and each of said intermediate plates have a front side with main teeth for engagement with teeth of a sprocket located on an inner peripheral side of said silent chain, wherein inside faces of said guide plates come into abutment with side faces of said teeth of said sprocket and are guided thereby;
   wherein rear faces of plate rows, which constitute a part of each of said articular plate rows and each of said intermediate plate rows, are formed with sub-teeth for engagement with teeth of a sprocket located on an outer peripheral side of said silent chain; and
   wherein rear faces of plate rows, which constitute a remainder of each of said articular plate rows and each of said intermediate plate rows, and rear faces of said guide plates rows are formed as flat faces which substantially lie in a same plane when said silent chain is in a stretched state.

2. The double-sided meshing type silent chain according to claim 1, wherein said flat faces are formed on rear faces of said guide plates.

3. The double-sided meshing type silent chain according to claim 2, wherein said rear face is projected outward with respect of said sub-teeth of each of said intermediate plate.

4. The double-sided meshing type silent chain according to claim 2, wherein said sub-teeth is projected outward with respect of said rear face.

5. The double-sided meshing type silent chain according to claim 1, wherein said flat faces are formed on rear faces of said guide plates and on rear faces of said articular plates adjacent to said guide plates.

6. The double-sided meshing type silent chain according to claim 5, wherein said rear face is projected outward with respect of said sub-teeth of each of said intermediate plate.

7. The double-sided meshing type silent chain according to claim 5, wherein said sub-teeth is projected outward with respect of said rear face.

* * * * *